(12) United States Patent
Brettschneider et al.

(10) Patent No.: US 11,114,906 B2
(45) Date of Patent: Sep. 7, 2021

(54) STATOR IN AN ELECTRIC MOTOR

(71) Applicant: Bühler Motor GmbH, Nürnberg (DE)

(72) Inventors: Jürgen Brettschneider, Nuremberg (DE); Richard Guttenberger, Greding (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 472 days.

(21) Appl. No.: 15/970,076

(22) Filed: May 3, 2018

(65) Prior Publication Data

US 2018/0323661 A1 Nov. 8, 2018

(30) Foreign Application Priority Data

May 5, 2017 (DE) .................... 10 2017 109 662.0

(51) Int. Cl.

| H02K 1/14 | (2006.01) |
|---|---|
| H02K 3/30 | (2006.01) |
| H02K 15/00 | (2006.01) |
| H02K 15/02 | (2006.01) |
| H02K 3/52 | (2006.01) |
| H02K 5/22 | (2006.01) |

(52) U.S. Cl.
CPC .............. *H02K 1/148* (2013.01); *H02K 3/30* (2013.01); *H02K 3/522* (2013.01); *H02K 5/225* (2013.01); *H02K 15/0062* (2013.01); *H02K 15/0068* (2013.01); *H02K 15/022* (2013.01); *H02K 2211/03* (2013.01)

(58) Field of Classification Search
CPC .......... H02K 15/0062; H02K 15/0068; H02K 15/022; H02K 1/148; H02K 2211/03; H02K 3/30; H02K 3/522; H02K 5/225
USPC ...................................... 310/254.1
See application file for complete search history.

(56) References Cited

U.S. PATENT DOCUMENTS

| 3,858,070 A * | 12/1974 | Hallerback | .......... H02K 5/1732 |
|---|---|---|---|
| | | | 310/90 |
| 5,268,604 A * | 12/1993 | Katakura | ............... H02K 3/522 |
| | | | 310/214 |
| 2007/0194653 A1* | 8/2007 | Prokscha | ............... H02K 3/522 |
| | | | 310/216.023 |
| 2013/0270934 A1* | 10/2013 | Smith | ................... H02K 7/145 |
| | | | 310/50 |

(Continued)

FOREIGN PATENT DOCUMENTS

| DE | 10 2014 220 201 A1 | 4/2016 |
|---|---|---|
| DE | 10 2015 211 786 A1 | 12/2016 |

(Continued)

*Primary Examiner* — Alex W Mok
(74) *Attorney, Agent, or Firm* — Westerman, Hattori, Daniels & Adrian, LLP

(57) ABSTRACT

A stator in an electric motor and to a method for producing the stator in which a plurality of individual coils are wound on laminated stator poles and are provided with an insulation, wherein the insulation bears connection contacts for bringing the individual coils into contact with a printed circuit board, wherein the connection contacts are press-fitted into the printed circuit board. The present stator provides for a compact size and for simple and economical joining processes. In a preferred embodiment, the electric motor is a dosing pump motor for drug delivery systems.

7 Claims, 8 Drawing Sheets

(56) References Cited

U.S. PATENT DOCUMENTS

| | | | |
|---|---|---|---|
| 2014/0015349 A1* | 1/2014 | Chamberlin | H02K 3/345 |
| | | | 310/43 |
| 2014/0232212 A1* | 8/2014 | Miyamoto | H02K 3/38 |
| | | | 310/43 |
| 2014/0265673 A1* | 9/2014 | Kreidler | H02K 3/522 |
| | | | 310/71 |
| 2014/0346921 A1* | 11/2014 | Muschelknautz | H02K 5/128 |
| | | | 310/216.131 |
| 2016/0099623 A1 | 4/2016 | Bohm et al. | |
| 2016/0111929 A1* | 4/2016 | Kessler | H02K 3/522 |
| | | | 310/71 |
| 2016/0261161 A1* | 9/2016 | Roos | H02K 3/522 |
| 2017/0093235 A1* | 3/2017 | Otsubo | H02K 1/2706 |
| 2017/0104378 A1* | 4/2017 | Dawson | H02K 3/28 |
| 2017/0302121 A1 | 10/2017 | Guttenberger et al. | |

FOREIGN PATENT DOCUMENTS

| | | | |
|---|---|---|---|
| DE | 10 2016 206 397 A1 | 10/2017 | |
| GB | 949659 A * | 2/1964 | H02K 11/046 |

\* cited by examiner

B - B

C - C

STATOR IN AN ELECTRIC MOTOR

CROSS-REFERENCE TO RELATED APPLICATIONS

The present patent application is based on, and claims priority from, German Application No. 10 2017 109 662.0, filed May 5, 2017, which is incorporated herein by reference in its entirety.

BACKGROUND OF THE INVENTION

(1) Field of the Invention

The invention relates to a stator in an electric motor and to a method for producing the stator. In particular, the stator is used in a dosing pump motor for drug delivery systems.

(2) Description of Related Art Including Information Disclosed Under 37 CFR 1.97 and 1.98

A prior art stator has a plurality of individual coils wound on laminated stator poles and is provided with an insulation, wherein the insulation bears connection contacts for bringing the individual coils into contact with a printed circuit board, wherein the connection contacts are in the printed circuit board. A board, a printed circuit board (PCB), or a baffle can serve as a circuit board.

During the production of wound stators consisting of individual metal sheets, a large number of inaccuracies arise, which accumulate from manufacturing tolerances during rolling of the metal sheets, during packaging, and during joining. Sheet metal stacks, in particular, have very large tolerances, which cause the terminal contacts to have a different axial extension for each stator pole core. In order to compensate for these unequal positions, a correspondingly thicker circuit board must be used, in particular, when press-fitting the terminal contacts, or a soldering process must be provided when using a thinner circuit board. Both options increase the cost and cycle times in the manufacture of the stator. In addition, more space is needed.

The aim of the invention is therefore, in the case of a generic stator, to provide for a compact size and for simple and economical joining processes.

BRIEF SUMMARY OF THE INVENTION

The present invention relates to a stator in an electric motor, where the stator consists of a plurality of laminated stator pole cores each having a first end and a second end. The stator also has a printed circuit board with contact recesses. An individual coil is wound on one of the laminated stator pole cores. First and second insulation caps are provided respectively at the first and second end of each stator pole core. Terminal connection contacts are provided on the first insulation caps for bringing the individual coils into contact with the printed circuit board wherein connection contacts are press-fitted into the contact recesses of the printed circuit board. A length tolerance between a first axial end of a stator pole core (base) and one end of the associated terminal contact at the second axial end of the stator pole core (3) is substantially less than the length tolerance of the stator pole core.

The present invention is based upon the fact that the length tolerance between a first axial end of a stator pole core (base) and one end of the associated terminal contact at the second axial end of the stator pole core is substantially less than the length tolerance of the stator pole core. The length tolerance of a laminated core can be up to a thickness of one metal sheet, with a conventional number of stacked metal sheets. However, the tolerance at the contact point between the terminal contacts and the printed circuit board may be only a fraction of this tolerance, for reasons of contact reliability. The advantages of the present invention also apply if a reference plane defines from which all stator pole cores extend axially.

The present invention also relates to a method for producing a stator in an electric motor with a plurality of individual coils wound on laminated stator pole cores provided at each end of the stator pole cores with an insulation in the form of a cap, wherein the insulation bears terminal contacts for bringing the individual coils into contact with a printed circuit board, wherein the terminal contacts are press-fitted into recesses defined in the printed circuit board. The method comprises the steps of: a) providing a plurality of stator pole cores having first and second ends; b) providing first insulating caps at the first end positively connected by a baffle; c) providing second insulating caps at the second end interconnected by a retaining element; d) joining the first and second insulating caps with the stator pole cores to a mounting assembly; e) winding the insulated stator pole cores with single pole windings and bringing the wire ends into contact with the baffle; f) separating retaining regions of the baffle and shearing press-fit regions; g) separating the retaining element from the mounting assembly; h) rounding the wound stator by positioning the stator pole cores about an elongated stator axis; i) press-fitting the stator into a housing; and k) joining the printed circuit board in the housing and pressing the circuit board via the terminal contacts.

BRIEF DESCRIPTION OF THE SEVERAL VIEWS OF THE DRAWINGS

An embodiment of the invention is explained in greater detail below with reference to the drawing. Wherein.

DETAILED DESCRIPTION OF THE INVENTION

Figure 1:
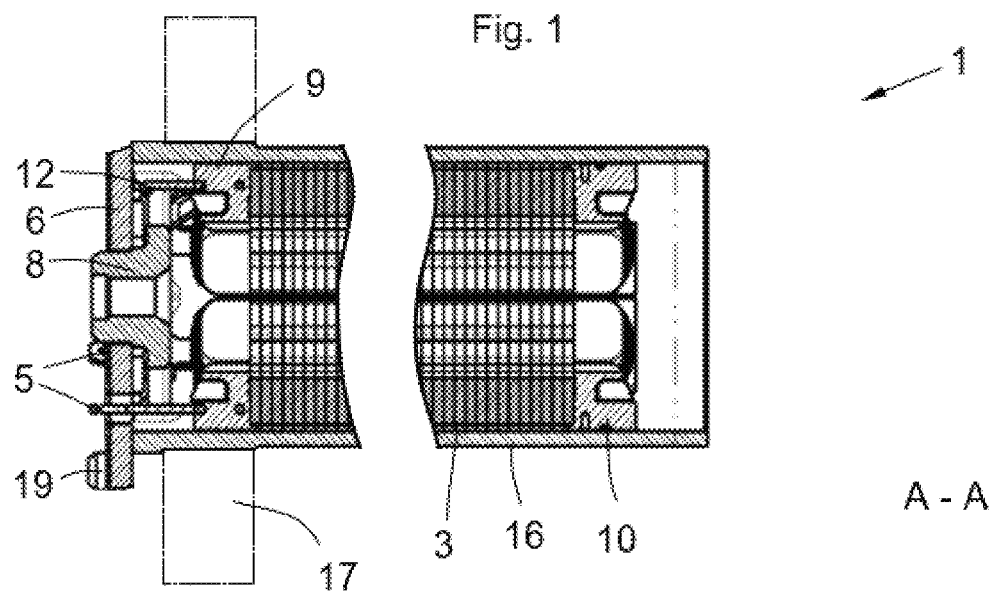
FIG. 1 is a first sectional view taken along lines A-A of FIG. 2 of the stator with mounted circuit board.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a first partial sectional view A-A of a stator 1 with mounted printed circuit board 6. The stator 1 has a housing 16 with a flange 17 integral therewith, from which project receptacle pins 19 for the reception and radial alignment of the printed circuit board 6, as well as a plain bearing sleeve 8 for accepting a shaft (not shown). The stator 1 further includes a plurality of stator pole cores 3, a plurality of first insulating caps 9, and a plurality of second insulating caps 10. A portion of the first insulating caps 9 is provided with terminal contacts 5, a further portion is provided with a star-point baffle 12, and, by this, connected to one another electrically and mechanically. The stator pole cores 3 are press-fitted into the housing 16. In addition, they can also be welded to the housing 16 via the insulating caps 9, 10. The housing 16, on its inner circumference, has no stop contours for the stator 1. The axial position of the stator 1 is set, over the depth of insertion relative to a reference plane that is measured.

Figure 5:
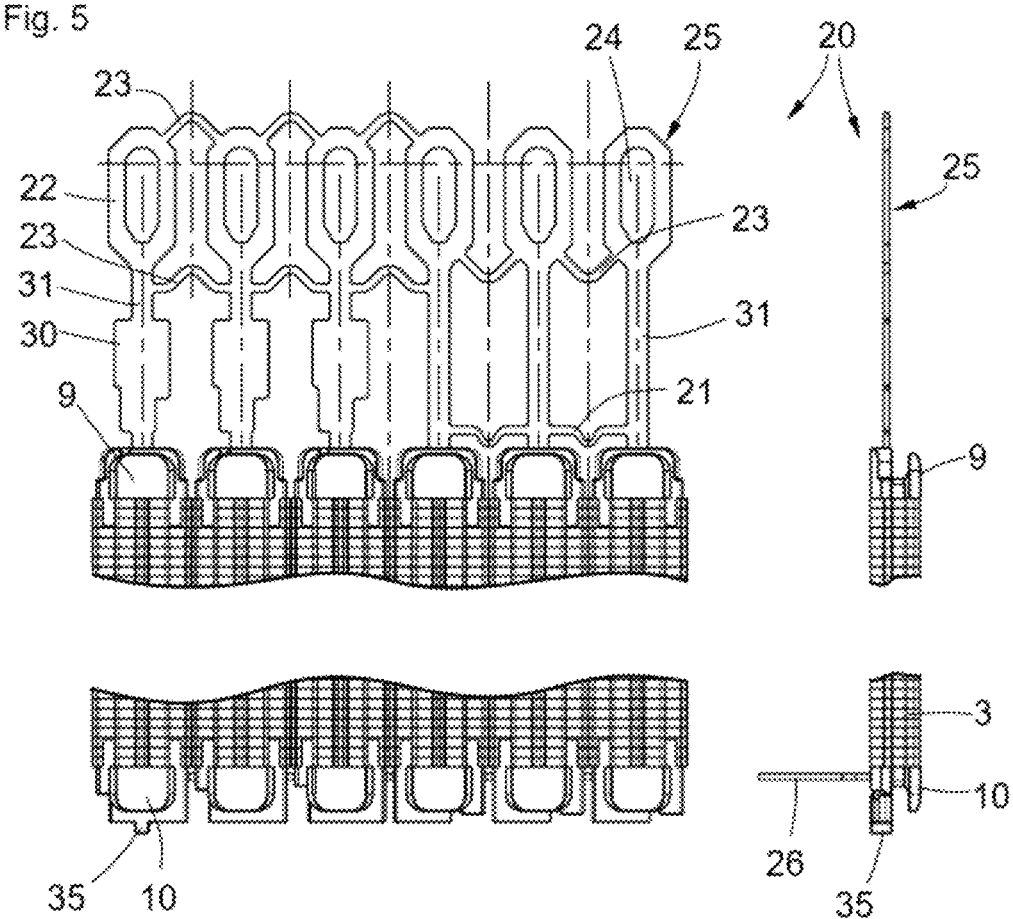
FIG. 5 is a first view of a mounting assembly of the stator.

Both the first insulating caps 9 and the second insulating caps 10 are not shaped identically to each other; in particular, they have different wire guide geometries and, in at least one case, a coding pin 35 (See FIG. 5).

Figure 2:
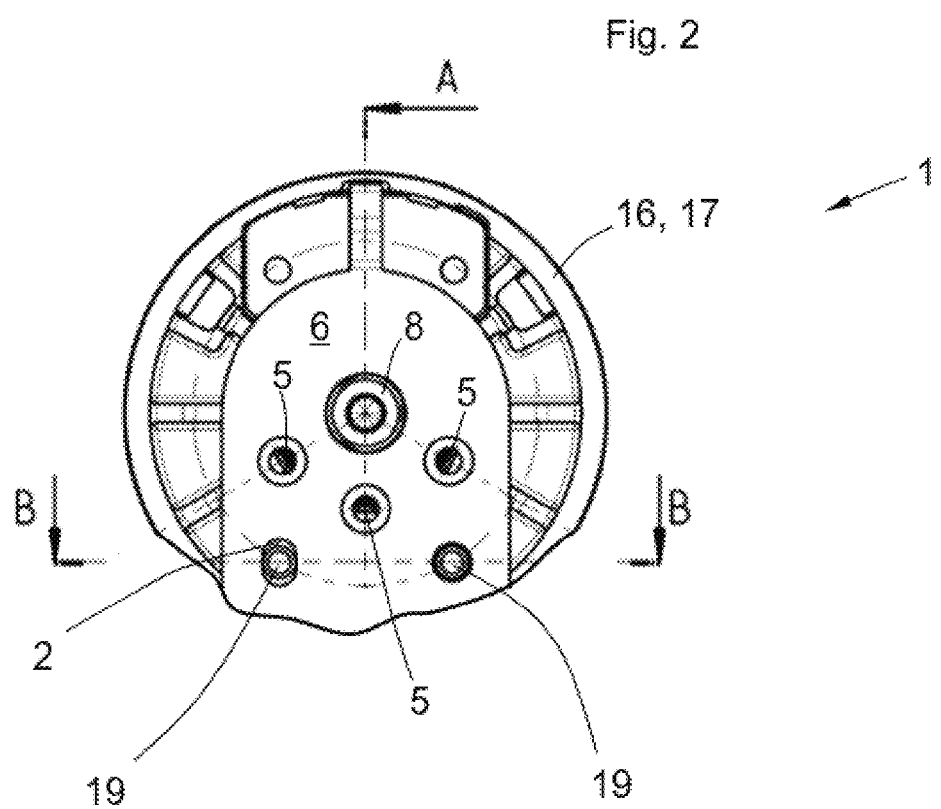
FIG. 2 is a side view of the stator.

FIG. 2 shows a side view of the stator 1, with the flange 17, as part of the housing 16 and the circuit board 6. The printed circuit board 6 is provided with recesses which are received on the plain bearing sleeve 8 or the receptacle pin 19. The circuit board 6 is centered by means of the plain bearing sleeve 8. One of the receptacle pins 19 defines the angular position, and a second receptacle pin 19 is received in an oblong hole 2, which compensates for inaccuracies. The terminal contacts 5 are press-fitted into contact recesses of the printed circuit board 6.

Figure 3:
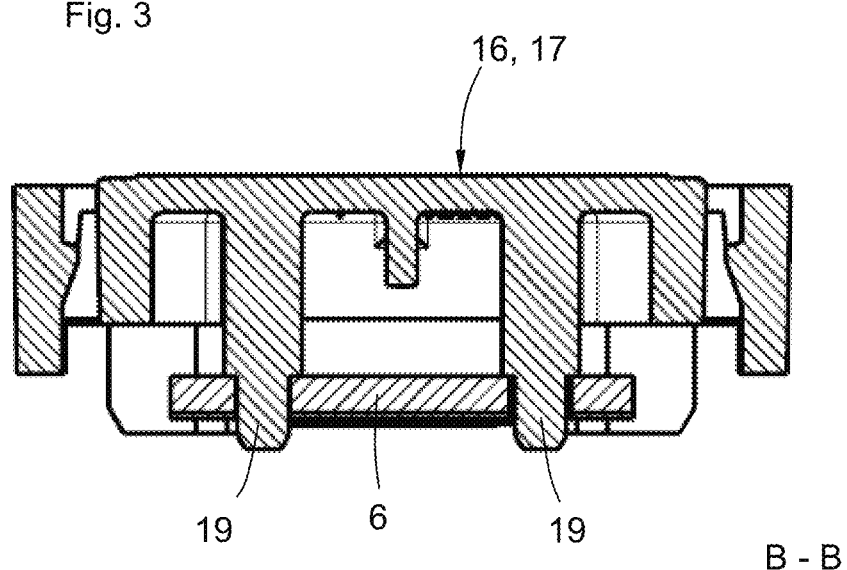
FIG. 3 is a partial sectional view along lines B-B of FIG. 2 of a housing and flange.

FIG. 3 shows a partial sectional view B-B of the housing 16, in the region of the flange 17, with the receptacle pins 19 and the printed circuit board 6.

Figure 4:
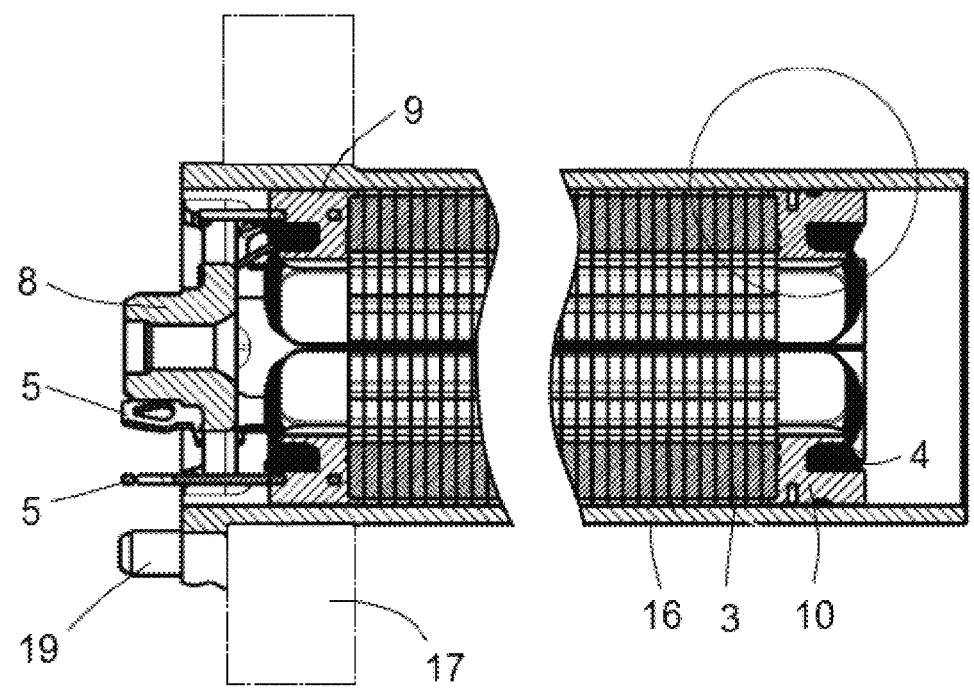
FIG. 4 is a second sectional view of the stator without a printed circuit board.

FIG. 4 shows a second sectional view similar to FIG. 1 of the stator 1 without circuit board 6, with the housing 16, the flange 17, the receptacle pin 19, the plain bearing sleeve 8, a plurality of stator pole cores 3, a plurality of first insulating caps 9, a plurality of second insulating caps 10, a plurality of individual coils 4, and the terminal contacts 5.

FIG. 5 shows a first view of a mounting assembly 20 of the stator 1, with a plurality of layered stator pole cores 3 arranged in a plane and made of magnetically conductive metal sheets, a plurality of first insulating caps 9, a plurality of second insulating caps 10, a baffle 25, and a retaining element 26. The baffle 25 has balancing bridges 21, as part of a later star-point baffle 12, a plurality of retaining sections 22 with perforated receptacles 24, auxiliary balancing bridges 23, connecting webs 31, blanks 30 in the form of enlarged surfaces from which later press-fit regions are punched free, and positive-fit sections buried in the first insulating caps 9 (see punch hole 7 in FIG. 9).

The retaining element 26 is received radially into the second insulating caps 10 in non-recognizable retaining recesses. This connection is produced by extrusion coating with a non-positive fit or with a slight undercut (for example, by notching), wherein the retaining elements 26, however, are removable in any case. The arrangement shown in a plane is suitable for a punching process in which the connecting webs 31 are severed. A second insulating cap 10 is integral with a coding pin 35, which serves for the positionally correct mounting in the housing 16.

Figure 6:
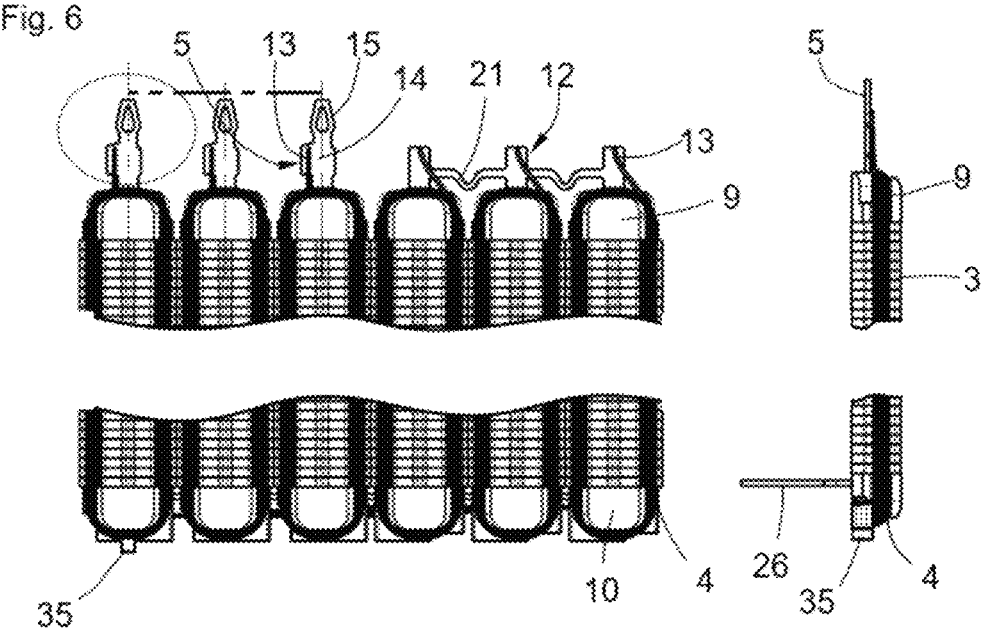
FIG. 6 is a second view of the mounting assembly after a separation step.

FIG. 6 shows a second view of the mounting assembly after a separation step. Shown are the stator pole cores 3, the first insulating caps 9, the second insulating caps 10, a star-point baffle 12 with balancing bridges 21, terminal contacts 5, with press-fit regions 15 and wire connection regions 14, and a plurality of single-pole coils 4 whose wire ends 13 are welded to the wire connection regions 14. Further, the coding pin 35 and the retaining element 26 are shown in the retaining recesses of the second insulating caps 10.

It is provided that the terminal contacts 5 with the insulation 9, 10, in particular, with first insulating caps 9, be force- or positive-fittingly connected, wherein the terminal contacts 5 in the joint area are perforated, toothed, or provided with at least one notch. The perforation, the teeth, or the notch allows insulating material of the insulating caps 9, 10 to fill the free space and causes a positive connection in the axial direction, whereby a release of the terminal contacts 5 is prevented from the insulating caps 9. This results in a very strong connection, which allows the terminal contacts in a raw form to also be used as a retention means in the manufacturing process. Alternatively, the terminal contacts 5 can also be mounted in a non-positive manner. In particular, terminal contacts with toothing contours (arrow-shaped, sawtooth-like) are suitable for this purpose.

This design is supplemented by the fact that the second insulating caps 10 have retaining recesses, in particular, retaining slots, for accepting a retaining means. This measure also serves to facilitate or at least simplify the production process, in particular, the handling and mounting of a stator assembly. In said retaining recesses, retaining means can be releasably received. The retaining recesses are radially aligned here, so that they form a positive connection in the axial direction.

Figure 7:
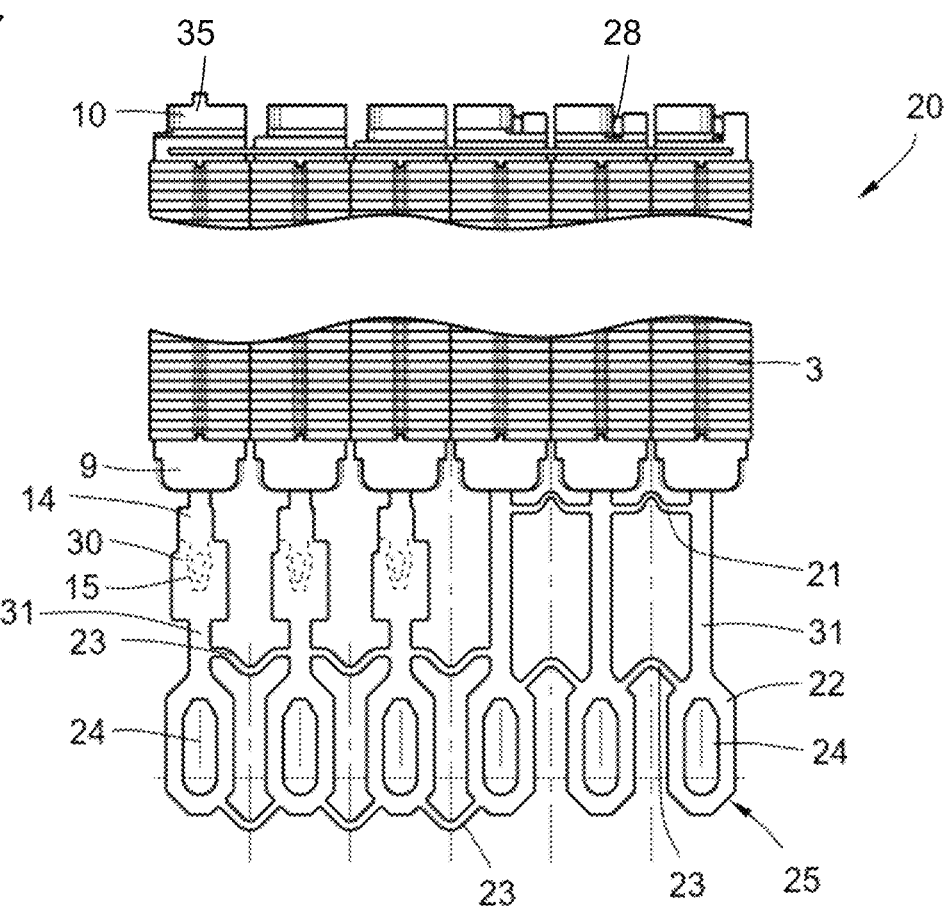
FIG. 7 is a rear view of the mounting assembly.

FIG. 7 shows a rear view of the mounting assembly 20 according to FIG. 5, with the stator pole cores 3, the first insulating caps 9, the second insulating caps 10, and the baffle 25. The baffle 25 has balancing bridges 21 as part of a later star-point baffle 12, blanks 30 with wire connection regions 14, connecting webs 31, retaining sections 22 with receptacles 24, and auxiliary balancing bridges 23. The blanks 30 form an enlarged punching area for the press-fit regions 15 still free to be punched (which are here indicated by dashed lines). The second insulating caps 10 have wire guide channels 28 through which the connecting wires are led from one coil to the next. In addition, the coding pin 35 can be seen.

Figure 8:
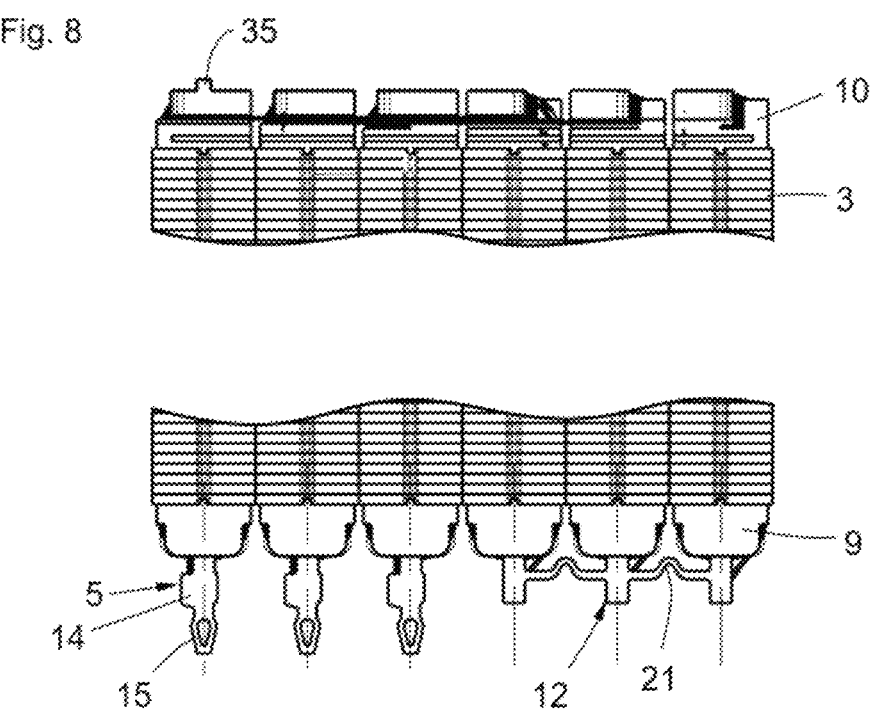
FIG. 8 is a second rear view after the separation step.

FIG. 8 shows a second rear view after the separation step, corresponding to FIG. 6, with the stator pole cores 3, the first insulating caps 9, the second insulating caps 10, with the coding pin 35, the star-point baffle 12 with the balancing bridges 21 and the terminal contacts 5 with the wire connection regions 14, and the press-fit regions 15.

Figure 9:
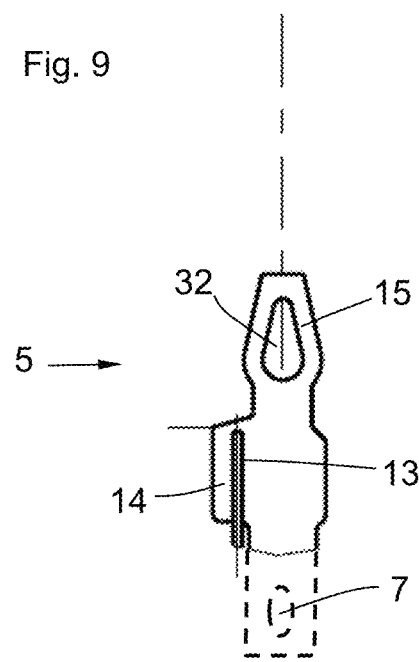
FIG. 9 is a partial view of a terminal contact.

FIG. 9 shows a partial view of a terminal contact 5, with a wire connection region 14, a press-fit region 15, a punch hole 7 (dashed line), and a wire end 13, which is welded to the wire connection region 14. The press-fit region 15 has V-shaped side edges, which run towards a blunt end. Between the V-shaped side edges, a core punch hole 32 is provided, which allows a slight bending of the press-fit contour.

Figure 10:
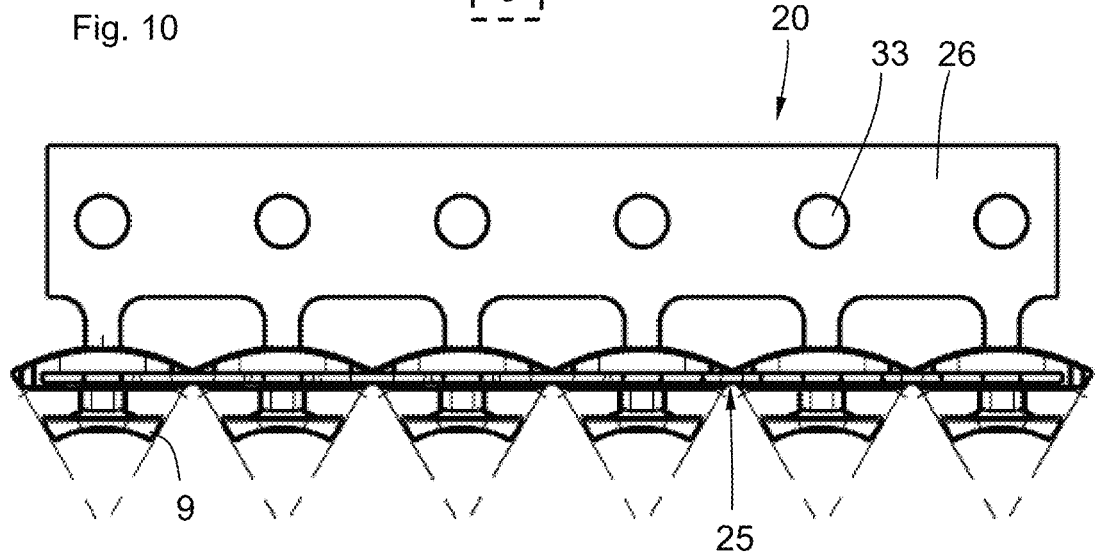
FIG. 10 is a first side view of the mounting assembly with retaining element.

FIG. 10 shows a first side or bottom view of the mounting assembly 20 with the retaining element 26, the first insulating caps 9, and the baffle 25. The retaining element 26 is formed as a continuous metal strip with a plurality of openings 33. In the form shown, the sheet metal strip cannot bend in the plane of the sheet metal. The openings 33 serve as receiving means for a retaining tool (not shown). The retaining element 26 serves as a reference surface for the free-punching operation of the terminal contacts 5.

Figure 11:
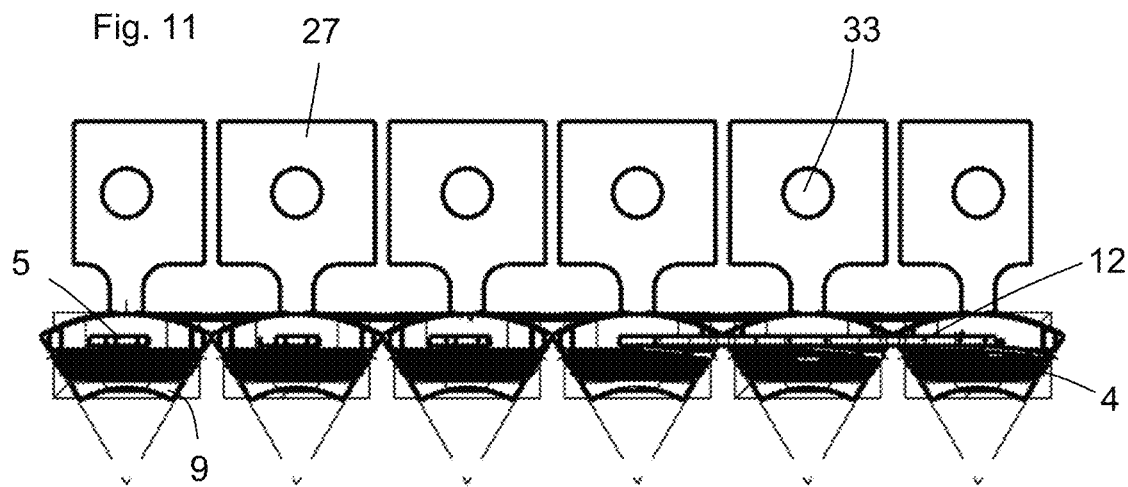
FIG. 11 is a second side view of the mounting assembly after the separation step.

FIG. 11 shows a second bottom view of a part of the mounting assembly after the separation step of the retaining section from the baffle, whereby the terminal contacts 5 and the star-point baffle 12 are punched free. Further free-punches separate the retaining element 26 into a plurality of retaining element sections 27. In this form, they can serve as retaining means during rounding whereby the stator pole cores are arranged about the stator longitudinal axis. The retaining element sections 27 ensure that, after the rounding, the axial arrangement of the stator pole cores 3, and thus the axial position of the terminal contacts 5, in particular, the press-fit regions, corresponds to the position of the layer before the rounding operation.

Figure 12:
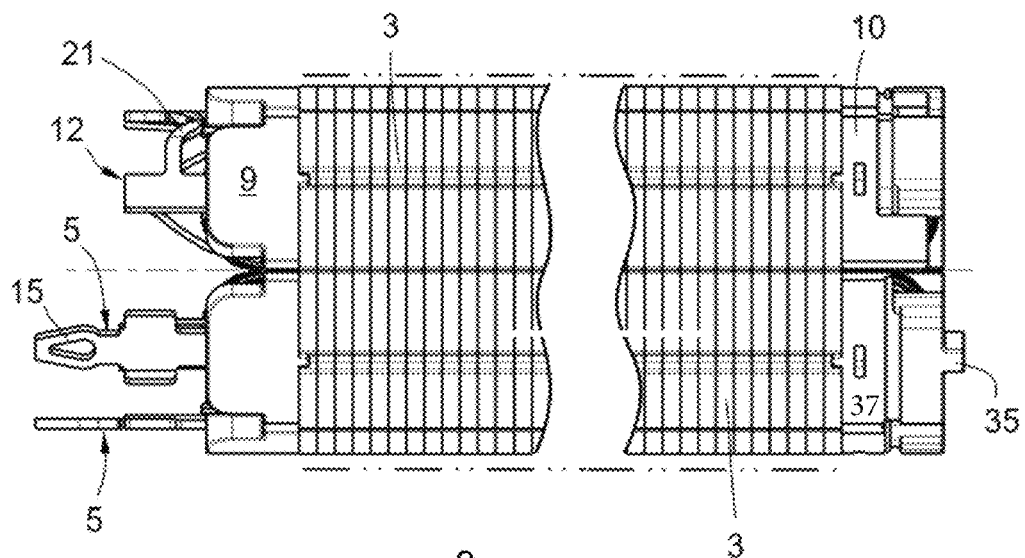
FIG. 12 is a rounded stator.

FIG. 12 shows an assembled stator after rounding (without housing and without printed circuit board), with a plurality of stator pole cores 3, a plurality of first insulating caps 9, a plurality of second insulating caps 10, with the coding pin 35, the terminal contacts 5, with their press-fit regions 15, the star-point baffle 12, with a balance bridge 21. The stator pole cores 3 are not rigidly connected to each other; rather, only a portion of the stator pole cores 3 are resiliently connected to each other via the balancing bridges 21.

Figure 13:
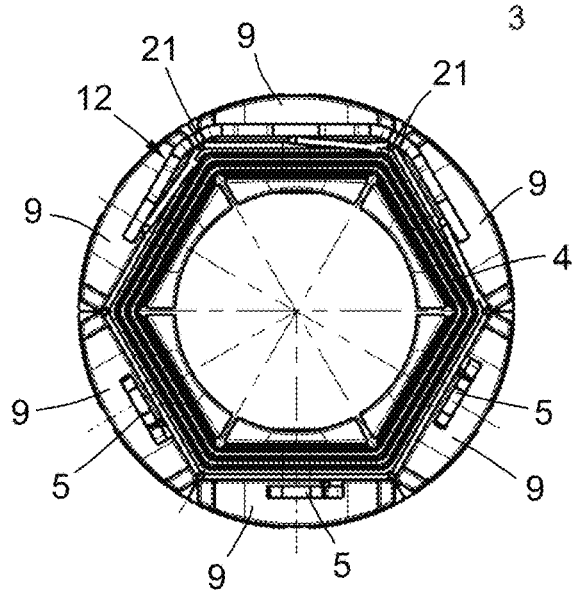
FIG. 13 is a first side view of the rounded stator.

FIG. 13 shows a side or bottom view of the rounded stator (without housing and without printed circuit board), with a plurality of stator pole cores 3, a plurality of first insulating caps 9, the single-pole coils 4, the terminal contacts 5, and the star-point baffle 12, with the balancing bridges 21.

Figure 14:
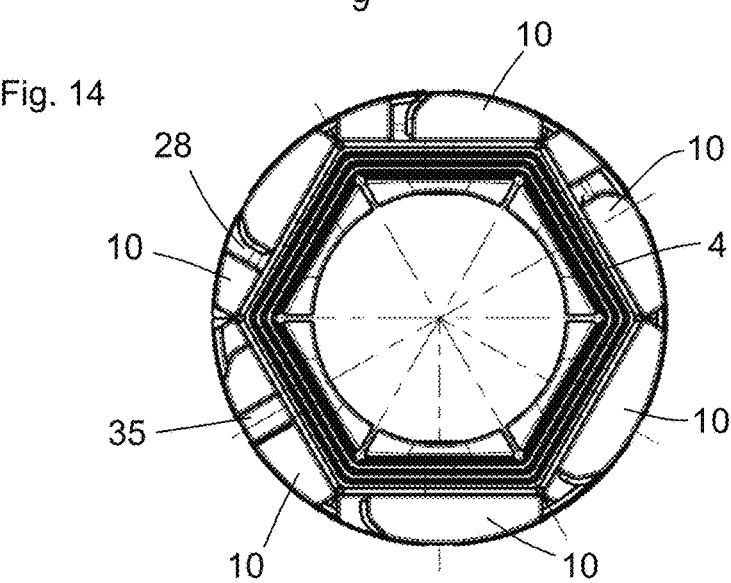
FIG. 14 is a second side view of the rounded stator.

FIG. 14 shows a second side or top view of the rounded stator (without housing and without printed circuit board), with a plurality of second insulating caps 10, the coding pin 35, the wire guide channels 28, and the single-pole coils 4.

Figure 15:
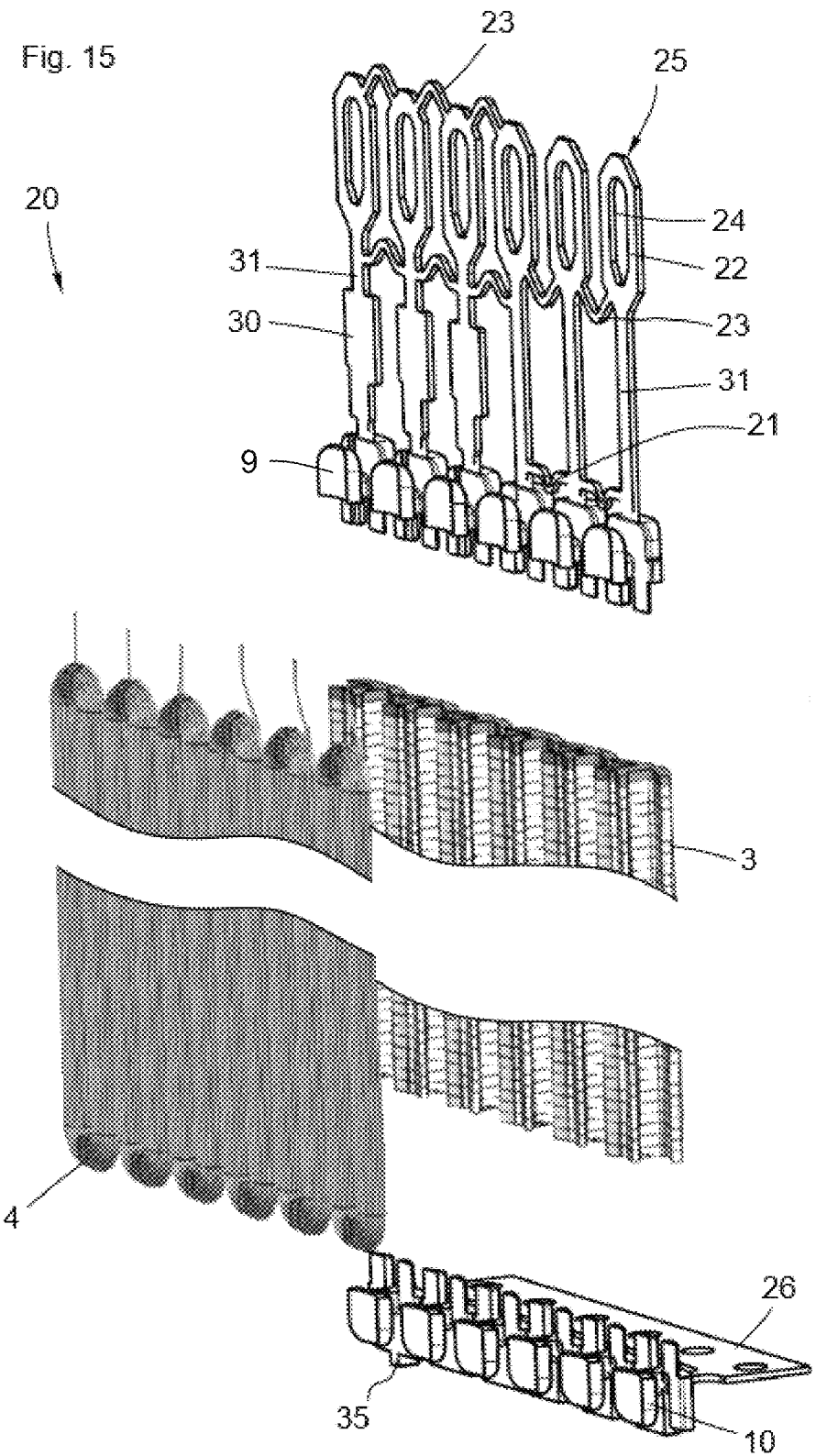
FIG. 15 is an exploded view of the mounting assembly.

FIG. 15 shows an exploded view of the mounting assembly 20, with the stator pole cores 3, the single-pole coils 4, the first insulating caps 9 with the baffle 25, the second insulating caps 10, with the coding pin 35, and the retaining element 26. The baffle has blanks 30, connecting webs 31, balancing bridges 21, retaining sections 22, auxiliary compensating bridges 23, and receptacles 24.

The two insulating caps 9, 10 are shaped so as to cover end portions of the stator pole cores 3 in an accommodating region for the individual coils. When assembled, the stator pole cores form slots, and the insulating caps 9, 10 form partial slot liners. It has been found that a complete slot liner is not required over the entire length of the stator pole cores. The insulating caps 9, 10 form, with the stator pole cores 3, positive connections in the radial direction.

Figure 16:
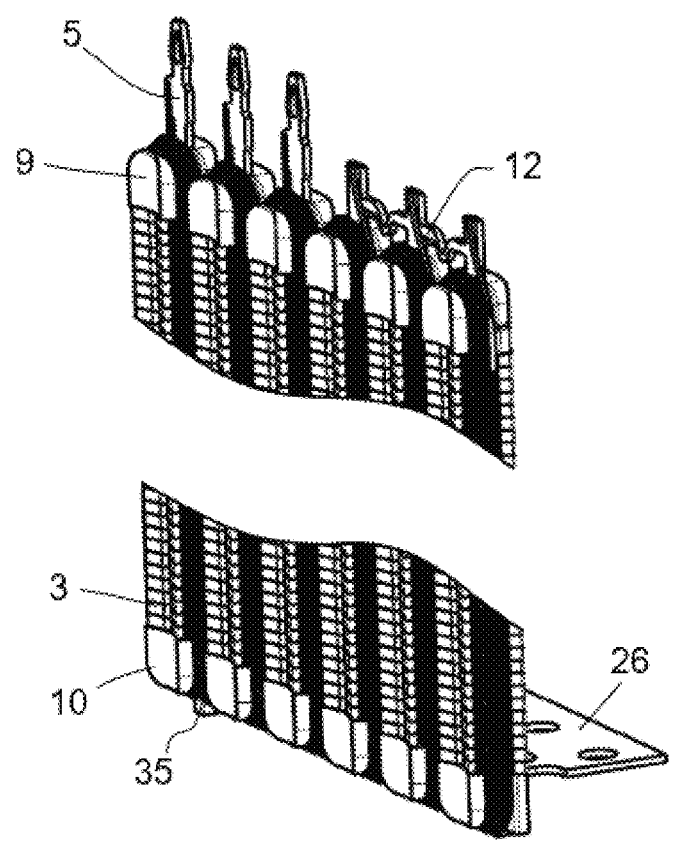
FIG. 16 is a perspective view of the mounting assembly after the separation step.

FIG. 16 shows a three-dimensional view of the mounting assembly before the rounding and after the separating step, with a plurality of stator pole cores 3, a plurality of first insulating caps 9, a plurality of second insulating caps 10, terminal contacts 5, the star-point baffle 12, the coding pin 35, and the retaining element 26.

With reference to FIGS. 5-11, according to one embodiment of the invention, a star-point baffle 12 is provided, which is positively connected to several first insulating caps 9, wherein the star-point baffle in the joint area 7 is perforated, serrated, or provided with at least one notch. Again, the positive connection is created by filling the perforation, the teeth, or the notch with the plastic material of the insulating caps 9. Alternatively, the star-point baffle can be mounted non-positively; for this purpose, star-point baffles with toothing contours (arrow-shaped, sawtooth) are, in particular, suitable. The star-point baffle also serves, in a raw form, as retaining means. Electrically, the star-point baffle forms a contact point for several individual coils 4. Contacting the printed circuit board 6 is possible in principle, but not provided. As a result, the number of printed circuit board contacts is minimized, and a simpler circuit board may be used. Further, this makes the mounting of the circuit board 6 easier.

Expediently as shown in FIG. 6, wire ends 13 of the individual coils 4 are electrically connected to the terminal contacts 5. For this purpose, the terminal contacts have a wire connection area 14. In addition, the terminal contacts each have at least one press-fit region 15, which must be formed very precisely in order to always ensure a secure contact with the circuit board. For this reason, it is also not allowed to make the position of these contacts dependent upon the tolerance of the laminated core length.

In order to generate the most secure connection possible between the wire ends 13 and the terminal contacts 5, they are welded or bonded together. For wire diameters of approx. 0.5 mm or more, welded connections as well as crimp connections can be reliably manufactured. Bonding is particularly suitable for very small wire diameters of less than 0.2 mm.

It is further provided that the star-point baffle 12 has balancing bridges 21 with tolerance compensation contours, wherein the length of the balancing bridges 21 along these tolerance compensation contours is greater than the bridged linear distance between adjacent contact points of the winding wire ends at the star-point baffle 12. As a result, the star-point baffle can compensate for large changes in shape and/or length which occur during a bending process. In particular, the star-point baffle can contact the individual coils 4 while they are arranged in a plane, and maintain this contact when the stator is rounded.

The aim of the invention is also achieved by the method, in which the following method steps are carried out: a) providing a plurality of stator pole cores 3; b) providing first insulating caps 9 positively connected by a guide plate 25, providing second insulating caps 10 interconnected by a retention element 26; c) joining the first and second insulating caps 9, 10 with the stator pole cores 3 to a mounting assembly 20; d) winding the insulated stator pole cores 3 with single pole windings and bringing the wire ends 13 of the windings into contact with the baffle 25; e) separating retaining regions of the baffle 25 and shearing press-fit regions 15; f) separating the retaining element 26 from the mounting assembly 20; g) rounding the wound stator; h) press-fitting the rounded stator 1 into a housing 16; i) joining the printed circuit board 6 in the housing 16 and pressing the circuit board 6 via the terminal contacts 5.

With reference to FIG. 5, the baffle 25 has a retaining section 22 with several perforated receptacles 24, but also the contours of the terminal contacts and the star-point baffle 12. The retaining section 22 as well as the retaining elements 26 are merely aids in the assembly process, including the winding of the isolated single-pole cores 3. The baffle 25 is dimensioned so that the later position of the terminal contacts 5, in particular, the press-fit regions 15 on the guide plate 25, is finally determined only by a separation process (FIG. 11). The separation takes place by shearing with the aid of a cutting tool, which is toleranced very accurately and thus determines the position of the press-fit contacts with corresponding accuracy. The separation process takes place in three steps: first, the press-fit contacts are perforated, then, the outer contour is cut, and, finally, the fastening area is cut off. The positive connection between the terminal contacts 5 and the insulating caps 9 remains, even after the separation of the auxiliary contours. The retaining element 26 consists of a sheet metal strip which cannot be bent in the sheet metal plane; therefore, it is separated from the second insulating caps 10 before rounding. The separation is done by pulling the retaining elements out of the retaining recesses.

According to a variant, the retaining element 26 remains joined in the retaining recesses during the rounding (FIG. 10). To facilitate the rounding, the retaining element 26 is separated into a plurality of retaining element sections 27 (FIG. 11). Their number corresponds to the number of stator pole cores 3.

Before the actual installation, the baffle 25 is extrusion coated with plastic material in an injection molding process as an insert in an injection molding machine, whereby the first insulating caps 9 are cast, wherein they are bound with the baffle 25 as an assembly. In order to produce a positive connection, the areas later enclosed by the plastic material each have perforations, toothings, or at least one notch, which is/are filled by the plastic material.

The retaining element 26, before installation, is extrusion coated with plastic material in an injection molding process as an insert in an injection molding machine, whereby the second insulating caps 10 are cast, wherein they are temporarily bound with the mounting element 26 to an assembly. In contrast to the baffle 25, the retaining element 26 is not, in the areas surrounded by the plastic material, perforated, toothed, or provided with notches or other permanent, positive-fitting contours, in order to facilitate later separation from the second insulating caps 27. However, it is possible to use notches or slight undercuts (e.g., dovetail), through which an increased retaining force is achieved during assembly. However, these geometries are dimensioned so that they allow disassembly.

It is particularly important that the axial position of the stator pole cores 3 be fixed in a shearing station and remain fixed during the rounding. As a result, no alignment process is needed, and the very precise location of the terminal contacts is maintained, even when rounding.

It is equally important that the fixed axial position of the stator pole cores 3 not be changed, even during the press-fitting process in the housing 16. In this way, the correct position arrangement of the press-fit contacts, from the shearing process to the assembly of the circuit board and the final assembly state, is maintained.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

| | |
|---|---|
| 1 | Stator |
| 2 | Oblong hole |
| 3 | Stator pole core |
| 4 | Single coil |
| 5 | Terminal contact |
| 6 | Circuit board |
| 7 | Punch hole |
| 8 | Plain-bearing sleeve |
| 9 | First insulating cap |
| 10 | Second insulating cap |

LIST OF REFERENCE NUMBERS -continued

| | |
|---|---|
| 12 | Star-point baffle |
| 13 | Wire end |
| 14 | Wire connection area |
| 15 | Press-fit region |
| 16 | Housing |
| 17 | Flange |
| 19 | Receptacle pin |
| 20 | Mounting assembly |
| 21 | Balancing bridge |
| 22 | Retaining section |
| 23 | Auxiliary balancing bridge |
| 24 | Receptacles |
| 25 | Baffle |
| 26 | Retaining element |
| 27 | Retaining element section |
| 28 | Wire guide channel |
| 30 | Blank |
| 31 | Connecting webs |
| 32 | Core punch hole |
| 33 | Opening |
| 35 | Coding pin |
| 37 | Notch |

What is claimed is:

1. A stator in an electric dosing pump motor for drug delivery systems, the stator comprising;
   a plurality of laminated stator pole cores having first and second ends;
   a printed circuit board with contact recesses;
   a plurality of individual coils having wire ends, each coil being wound on one of the laminated stator pole cores;
   first insulation caps provided at the first end of each stator pole core;
   a plurality of the first insulating caps having a star-point baffle and the star-point baffle being positively or non-positively connected to the first insulating caps, wherein, in the contact recesses, the plurality of the first insulating caps are perforated, serrated, or provided with at least one notch;
   second insulation caps provided at the second end of each stator pole core;
   terminal connection contacts provided on the first insulation caps for bringing the individual coils into contact with the printed circuit board, the wire ends being electrically connected to the terminal contacts, wherein the terminal connection contacts are press-fitted into the contact recesses of the printed circuit board, so that the length tolerance between the first axial end of a stator pole core and one end of the associated terminal contact at the first axial end of the stator pole core is substantially less than the length tolerance of the stator pole core; and
   the star-point baffle has balancing bridges with tolerance compensation contours, wherein the length of the balancing bridges along these tolerance compensation contours is greater than the bridged linear distance between adjacent contact points of the winding wire ends at the star-point baffle.

2. The stator according to claim 1, wherein the length tolerance between a reference plane, which defines the position of the first axial ends of the stator pole cores, and an end of each terminal contact facing the printed circuit board is substantially less than the length tolerance of a stator pole core.

3. The stator according to claim 1, wherein the terminal contacts with first insulating caps are positively or non-positively connected, wherein the connection contacts are perforated, toothed, or provided with at least one notch.

4. The stator according to claim 3, wherein the first and second insulating caps accept the stator pole cores in a form-fitting manner.

5. The stator according to claim 1, wherein the second insulating caps have holding recesses for accepting a retaining means.

6. The stator according to claim 1, wherein the terminal contacts have a wire connection region and a press-fit region.

7. The stator according to claim 1, wherein the wire ends of the individual coils are welded, bonded, soldered, or crimped to the terminal contacts to the wire connection region.

* * * * *